Oct. 18, 1949.    W. S. RAE, JR    2,485,537
LIQUID SEALED TRAP
Filed May 16, 1945

INVENTOR.
Walter S. Rae, Jr.
BY
Ralph *** Brown
ATTORNEY.

Patented Oct. 18, 1949

2,485,537

UNITED STATES PATENT OFFICE 2,485,537

LIQUID SEALED TRAP

Walter S. Rae, Jr., West Allis, Wis., assignor to The Falk Corporation, Milwaukee, Wis., a corporation of Wisconsin Application May 16, 1945, Serial No. 594,019

4 Claims. (Cl. 286—9)

This invention relates to liquid sealed traps.

The trap of the present invention is intended primarily for use with the housings of gear sets and other power equipment having a rotating shaft projecting through the bottom thereof to provide an effective and permanent seal against leakage losses through the shaft opening in the housing, although other uses requiring a hermetic seal between rotating and non-rotating members is contemplated.

One object of the present invention is to provide an improved liquid sealed trap for the purposes above indicated.

Another object is to provide an effective and permanent seal for the bottom of a lubricant retainer housing to prevent leakage losses through a shaft opening therein.

Another object is to provide a liquid sealed trap for the purposes indicated in which the trapped liquid is maintained out of contact with the sealing liquid to thereby avoid impairing the effectiveness of the sealing liquid or the quality of the trapped liquid.

Another object is to provide a liquid sealed trap so constructed as to effectively retain the sealing liquid during handling and shipment.

Other more specific objects and advantages will appear, expressed or implied, from the following description of an illustrative embodiment of this invention.

Figure 1:
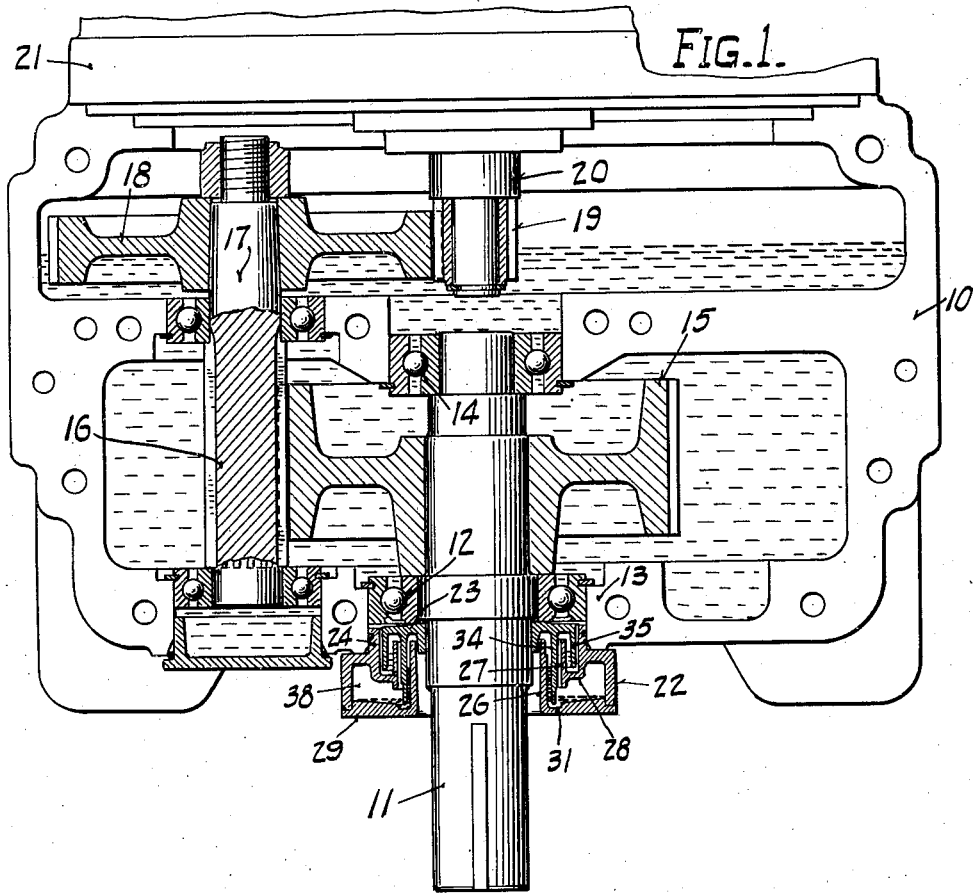
Figure 1 is a vertical sectional view of a housed gear set equipped with a liquid sealed trap constructed in accordance with the present invention.
Figure 2:
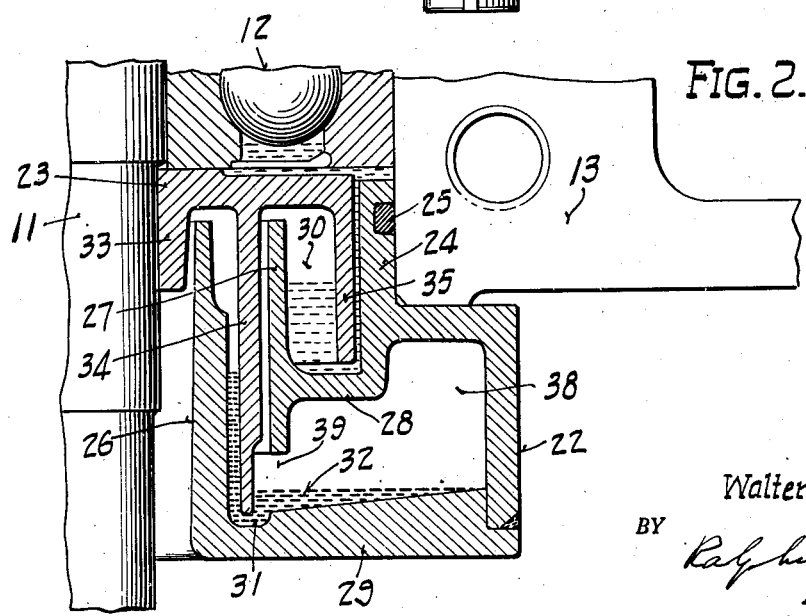
Fig. 2 is an enlarged fragmentary sectional view of the trap shown in Fig. 1.

The gear set selected for illustration comprises a vertically split substantially circular housing 10 having a driven shaft 11 projecting vertically through the bottom thereof. The shaft 11 is shown journalled in a lower bearing 12 seated in an appropriate bored hub 13 and an upper bearing 14 seated in a suitable support spanning the interior of the housing. A gear 15 fixed to the shaft 11 meshes with a pinion 16 formed on a vertical counter shaft 17 which also carries a gear 18 that meshes with and is driven by a pinion 19 on the rotor shaft 20 of a motor 21. The motor 21, seated upon and fixed to the housing 10, provides a top closure therefor. The several operating parts are in this instance lubricated by a bath of oil confined within the housing 10.

The liquid sealed trap shown is effective to seal the housing 10 against loss of oil through the bored hub 13 through which the shaft 11 projects. It comprises a stationary part in the form of a hollow annular structure 22 externally applied to the bottom of the housing and a cooperating rotating part in the form of a flanged disk 23 fixed to the shaft 11.

In this instance the stationary hollow structure 22 is provided with an upstanding circular flange 24 having a pressed fit within the hub 13 and grooved to receive an appropriate sealing gasket 25 between it and the hub 13. The inner peripheral wall of the structure 22 is in the form of an upstanding circular flange 26 of a diameter to loosely encircle the shaft 11. A third upstanding circular flange 27 is provided between the flanges 24 and 26. Flange 27 is carried by the depressed top 28 of the structure 22 and preferably extends downward to a point not far from the bottom 29 of the structure for a purpose which will hereinafter appear. Flange 27 also cooperates with flange 24 to form an annular channel 30 positioned to intercept all oil that may escape from the housing 10 through the hub 13. A shallow annular groove 31 provided at the base of the flange 26 provides a retainer well for a supply of sealing liquid 32, preferably of high specific gravity such as mercury; and the bottom 29 of the structure is preferably fashioned to slope toward the groove 31 to direct the sealing liquid thereto.

The rotating disk 23 is shown provided with a supporting hub 33 fixed to the shaft 11. The disk 23 carries a deep ring or baffle 34 disposed between the flanges 26 and 27 and extending downward into sealing contact with the liquid in the well 31, and a second ring or baffle 35 carried by the disk is disposed to extend downward between the flanges 24 and 27 into sealing contact with the intercepted oil contained in the channel 30.

It will thus be noted that the annular chamber 38 within the hollow structure 22 is effectively closed and sealed by the baffle rings 34 and 35, the ring 34 coacting with the liquid in well 31 to seal this chamber at one point and the ring 35 coacting with the liquid in the channel 30 to seal it at the only other point of possible outlet; and it will of course be understood that the body of air thus trapped within the chamber 38 reacts on the exposed surface of the liquid in the channel 30 to effectively sustain the head of oil in the housing 10.

The trap and particularly the non-rotating part thereof, including the hollow structure 22 containing the sealing liquid 32, is preferably applied to the bottom of the housing 10 before the latter has received its supply of oil. Then when the oil is admitted to the housing, some of this oil finds its way through the hub 13 into the channel 30 where it cooperates with the lower edge of the baffle 35 to effectively trap the air contained in the chamber 38 and in the upper part of the channel 30. Thereafter, as the level of the oil between the baffle 35 and flange 27 rises, this trapped air is thereby compressed and its pressure increased to a value capable of sustaining the head of oil in the housing. In this connection it will be noted that the spacing between the baffle 35 and flange 27 is such that a moderate rise in the oil level therein is sufficient to increase the air pressure to a point where it will sustain the head of oil, so that the oil level in the channel 30 never reaches the upper edge of the flange 27, and so that the latter functions as a barrier to prevent contact between this oil and the sealing liquid in the chamber 38.

It will also be observed that before the hollow structure 22 has been applied to the housing 10 it is open to the atmosphere through the narrow channel between the flanges 26 and 27 and through the relatively narrow gap 39 between the bottom of the flange 27 and the bottom of the chamber 38. Nevertheless, with those parts constructed and arranged in the manner hereinabove described, it is impossible for the liquid 32 to escape from the chamber 38 no matter how the structure may be tilted or even inverted. Only a small charge of sealing liquid is required for successful operation and the capacity of the chamber 38 is such as to confine this liquid wholly below the gap 39 whenever the structure 22 is tilted through any angle or in any direction from the position shown. After the structure 22 has once been charged with the small amount of sealing liquid required, this liquid thus becomes and remains a unitary part of the structure permitting the latter to be safely handled and shipped without danger of liquid loss.

Various changes may be made in the embodiment of the invention hereinafter specifically described without departing from or sacrificing the advantages of the invention as defined in the appended claims.

I claim:

1. A seal for a liquid retainer housing having a rotary shaft extending through a bottom opening in said housing, said seal comprising a hollow structure for support by said housing, said structure being shaped to provide an annular air chamber and having a cover portion overlying said chamber, said cover portion having an annular channel for intercepting leakage through said opening, said structure also having an upstanding ring spaced from said cover portion, and a member rotatable with said shaft and having a circular baffle projectable between said ring and cover portion into sealing contact with liquid in said chamber, said member also having a second circular baffle for sealing contact with intercepted liquid in said channel and cooperating with said first named baffle to trap the air within said chamber.

2. A seal for a liquid retainer housing having a rotary shaft extending through a bottom opening in said housing, said seal comprising a hollow annular structure for support by said housing and having a cover portion extending inwardly from the outer periphery thereof, said structure also having an upstanding ring cooperating with said cover portion to form a channel for intercepting leakage through said opening, said structure also having a second upstanding ring spaced inwardly from said first named ring, and a member rotatable with said shaft and having a circular baffle extending between said rings into sealing contact with liquid in the bottom of said structure, said member also having a second circular baffle for sealing contact with liquid in said channel and cooperating with said first named baffle to trap the air within said structure.

3. A seal of the character described comprising two members one rotatable relative to the other, one of said members having an annular air chamber therein, the bottom of said chamber having a portion thereof depressed to form an annular liquid retainer well, said chamber having an overlying cover portion shaped to provide a liquid retainer channel, a circular baffle carried by the other of said members and projectable below said cover portion into sealing contact with liquid in said well, and a second circular baffle carried by said other member for sealing contact with liquid in said channel.

4. In a seal of the character described a liquid retainer member therefor comprising a hollow structure having an annular air chamber therein, the bottom of said chamber being closed and being depressed along the inner periphery thereof to form a liquid receiving well, the cover of said chamber extending inwardly from the outer periphery thereof, and the inner peripheral wall being extended upwardly from said bottom above said cover and spaced therefrom to provide an annular opening in the top of said chamber, and a circular flange depending from said cover adjacent said opening to prevent loss of liquid from said chamber upon inverting the same.

WALTER S. RAE, JR.

REFERENCES CITED

The following references are of record in the file of this patent:

UNITED STATES PATENTS

| Number | Name | Date |
|---|---|---|
| 725,937 | Craig | Apr. 21, 1903 |
| 1,078,727 | Geiger | Nov. 18, 1913 |
| 1,887,006 | Boensch | Nov. 8, 1932 |
| 1,931,706 | Powell | Oct. 24, 1933 |
| 2,039,493 | Quilliam | May 5, 1936 |